United States Patent [19]

Miess et al.

[11] Patent Number: 5,149,759

[45] Date of Patent: Sep. 22, 1992

[54] PROCESS FOR PREPARING AROMATIC POLYAMIDES OF HIGH HYDROLYSIS RESISTANCE WITH CONTROLLED WATER CONTENT OF DIAMINE

[75] Inventors: Georg-Emrich Miess, Königstein; Peter Klein, Wiesbaden; Wilfried Pressler, Kelkheim, all of Fed. Rep. of Germany

[73] Assignee: Hoechst Aktiengesellschaft, Frankfurt am Main, Fed. Rep. of Germany

[21] Appl. No.: 679,922

[22] Filed: Apr. 3, 1991

[30] Foreign Application Priority Data

Apr. 5, 1990 [DE] Fed. Rep. of Germany ....... 4010941

[51] Int. Cl.$^5$ ............................................. C08G 69/28
[52] U.S. Cl. .................................. 528/348; 528/179; 528/182; 528/183; 528/185; 528/335; 528/336; 528/340
[58] Field of Search ............... 528/348, 340, 336, 335, 528/179, 182, 183, 185; 526/59, 60

[56] References Cited

U.S. PATENT DOCUMENTS 3,884,881  5/1975  Bice et al. .......................... 528/335
4,396,758  8/1983  Nikiforov et al. .................. 528/335

Primary Examiner—Harold D. Anderson

[57] ABSTRACT

There is described a process for preparing aromatic polyamides of high hydrolysis resistance by reacting aromatic diamines in a conventional organic solvent and in the presence or absence of inorganic salts wherein the diamine, which has a water content of up to 25% by weight, is dissolved in the organic solvent, which may likewise contain water, and the solution is subjected to a vacuum distillation until the water content of the bottom product is <100 ppm and subsequently the inorganic salts if necessary and then the dicarbonyl dichloride are added in a conventional manner and the condensation reaction is performed and concluded in a conventional manner.

11 Claims, No Drawings

PROCESS FOR PREPARING AROMATIC POLYAMIDES OF HIGH HYDROLYSIS RESISTANCE WITH CONTROLLED WATER CONTENT OF DIAMINE

DESCRIPTION

The present invention relates to a process for preparing aromatic polyamides (hereinafter called aramids) of high hydrolysis resistance using water-containing diamines and water-containing organic solvents.

Aramids are high molecular weight aromatic polyamides which can be spun, some from organic solvents, others from sulfuric acid, into filaments of extremely high mechanical strength and very high temperature resistance. These filaments have therefore proved to be widely usable, in particular for industrial purposes. The preparation of aramids and processes for spinning these polymers are known from numerous publications.

Aramids are prepared by reacting aromatic diamines or mixtures thereof, preferably aromatic diamines where the amino groups are para or in a comparable coaxial position on the aromatic nucleus, with aromatic dicarbonyl dichlorides, preferably those where again the carbonyl chloride groups are para on the aromatic radical, in a suitable organic solvent. It has been found advantageous here to use not individual aromatic diamines but mixtures of different aromatic diamines, since this produces aramids which have more favorable solubility characteristics and as a result are technically simpler to spin into filaments. Another way of obtaining aramids of improved solubility in organic solvents involves the exclusive or non-exclusive use of diamines where the amino groups are meta on the aromatic nucleus and/or diamines which create angles in the polymer chain, e.g. diamines with ether groups and/or diamines with substituents on the aromatic rings. Similarly, the exclusive or non-exclusive use of aromatic meta-dicarbonyl dihalides gives aramids of improved solubility in organic solvents.

Of the large number of publications concerning aramids of various structures, DE-C-22 19 703 and U.S. Pat. No. 3,819,587 may be cited for aramids composed exclusively of para-diamines and/or dicarboxylic acid units, U.S. Pat. No. 3,505,288 and DE-A-1 595 681 for aramids composed of angled aromatic units, e.g. units with ether linkages, and/or aromatic meta-diamines and/or meta-dicarboxylic acids, and DE-A-35 10 655 for aramids which are composed substantially from para-diamines and para-dicarboxylic acids but contain various diamines in the chain.

The reaction between the aromatic diamines and aromatic dicarbonyl dichlorides takes place in organic solvents which should be very good solvents for the aramids formed. Such solvents may be found in the class of the amides of lower aliphatic carboxylic acids and of phosphoric acid. Commonly used solvents of this kind are dimethylformamide, dimethylacetamide, hexamethylphosphoramide and in particular and particularly preferably N-methylpyrrolidone As revealed in the cited references, it has frequently been found to be advantageous and necessary to further improve the solubility of the aramids in organic solvents by adding certain inorganic salts which possess a dramatic solubilizing effect. Effective salts of this kind are in particular the alkaline earth metal and lithium halides, especially calcium chloride and lithium chloride.

To prepare aramids by prior art methods it is necessary to use a substantially water-free medium. For instance, German Offenlegungsschrift 2,219,703 stipulates that the water content of the polymerization batch for the preparation of aramids described therein must be below 300 ppm. Most publications even stipulate a water content of below 100 ppm. See for example the Journal of Applied Polymer Science, Volume 26 (4), page 1,211 to 1,220, and Japanese Patent Publication JP-51/127197 (Chemical Abstracts, 86:56 211n), where the polycondensation between the diamine and the dicarbonyl dichloride must be carried out in a medium having a water content of only 38 ppm.

If the low water contents stipulated in the literature are not maintained in the polycondensation batches, the aramids obtained produce, on spinning, filaments of lower hydrolysis resistance and poorer mechanical properties, for example lower strength and lower initial modulus. This represents the loss of a particularly advantageous property, and the fiber material thus obtained can no longer be used for many industrial purposes. According to the prior art, it was therefore necessary that all starting materials which are to be used for preparing aramids be virtually completely freed of water. This is not only costly in practice but also leads additionally to losses of material and to disadvantages with the practice of the polycondensation. High costs are created by the need that before use the solvents be distilled and carefully rectified to remove from them the water present in commercial grades and the levels of free aliphatic amines present therein (commercial N-methylpyrrolidone generally contains for example about 500 ppm of water and up to 0.01% of methylamine).

Similarly, drying the aromatic diamines is very costly, since, because of the high sensitivity in particular of para-diamines, which are very readily oxidized to strongly colored, quinoidal products, it must be carried out under very gentle conditions in a dry inert gas atmosphere, preferably under reduced pressure.

Moreover, in the drying of solvents and diamines, it is impossible, despite every care being exercised, to avoid losses which not only make the process more expensive but also may give rise to ecological problems.

A further serious disadvantage of existing processes is that very dry diamines are very prone to dusting. For toxicological reasons, however, dusts must be painstakingly avoided. They must therefore be handled with greatest care.

The present invention then provides a process for preparing hydrolysis-resistant aramids which largely overcomes the problems of prior art processes. Using the process of the present invention the aramids are prepared as in existing processes by reacting aromatic dicarbonyl dichlorides or dicarbonyl dichloride mixtures with aromatic diamines or diamine mixtures in an organic solvent customary for preparing aromatic polyamides and in the presence or absence of a known inorganic salt which increases the solubility of the aromatic polyamide product in the organic solvent. However, the process of the present invention differs radically from the prior art processes in that the diamine or diamine mixture with a water content of up to 25% by weight is dissolved in the organic solvent, which in turn may contain water, preferably not more than 1%, and this solution is subjected to a vacuum distillation in an inert gas atmosphere at a pressure of from 100 to $5\times10^3$ Pa at a bottom of column temperature which depending on the distillation pressure used ranges from about 20° to 160° C., preferably from 50° to 120° C., until the water content of the bottom product is below 100 ppm, preferably below 50 ppm. The bottom product obtained is then mixed in a conventional manner with the inorganic salts, if necessary, and thereafter with the dicarbonyl dichloride or dicarbonyl dichloride mixture and the condensation reaction is carried out as usual at from 20° to 100° C., preferably at from 30° to 80° C.

The process of the present invention can with advantage be used for preparing any hitherto known type of aramid. For instance, it can be used to prepare the extremely strong but also extremely insoluble aramid grades which are composed of substantially uniform exclusively para dicarboxylic acids and diamine units. However, it is also possible to obtain grades of improved solubility by using, as described earlier, mixtures of diamines or dicarbonyl dichlorides which introduce a certain flexibility into the polyamide chain or which at least disorder the secondary structure of the aramid obtained. Of course, the process of the present invention can also be used to effect very considerable improvements in processes for preparing aramids of improved solubility where an addition of meta chain units takes place, for example an addition of isophthalic acid or aromatic meta-diamines.

The process of the present invention can also be carried out using organic solvents with a higher water content, for example a water content of from 2 to 5%, provided the distillation time is extended accordingly. However, the use of solvents with such a high water content is in general not economically suitable because of the length of distillation required.

The diamines or diamine mixtures to be used in the process of the present invention generally contain up to 25% by weight of water. The process of the present invention can of course also be carried out with diamines or diamine mixtures which contain even more water, provided the distillation of the diamines in the organic solvent is appropriately extended. However, a particular advantage of the process of the present invention, then, is that it is possible to use as-prepared moist diamines, i.e. diamines which need not be subjected to a drying operation associated with losses and the risk of oxidation. Such as-prepared moist diamines generally have a water content of not more than 25% by weight. For this reason it is particularly advantageous to use such diamines and diamine mixtures with water contents up to 25% by weight for the process of the present invention. The lower limit of the water content should if possible not be below 10% by weight, although the process of the present invention can of course also be carried out with diamines and diamine mixtures whose water content is lower. However, a water content of above 10% has the appreciable advantage that these products are no longer prone to dusting and therefore can be processed in the plant with appreciably greater safety. Completely dry diamines are advantageously moistened with sufficient water before use that they are no longer dusting when handled.

The process of the present invention is in general carried out with an organic solvent having a water content of up to about 500 ppm. Again, it bears repeating that it is of course also possible to use organic solvents having a higher water content, provided subsequent distillation of the diamine solution is appropriately extended. The reason why the use of organic solvents having a water content of up to 500 ppm is advantageous is that such solvents are not only commercially available but also recoverable from the aramid production process by simple recycling operations.

A particularly advantageous form of the process of the present invention therefore involves the use of organic solvents which were recovered from the same process.

The diamine solution is distilled according to the present invention in an inert gas atmosphere and advantageously with stirring. The pressure under which the distillation is carried out is normally within the range 30 from 100 to $5\times10^3$ Pa, the resulting distillation temperature ranging from 20° to 160° C., depending on the pressure used. For technical reasons it is particularly advantageous to employ a pressure of from $2\times10^3$ to $4\times10^3$ Pa and a distillation temperature which varies with the pressure within the range from 50° to 120° C.

Advantageously, the distillation of the diamine solution is carried out in a distillation column having a control means for the reflux ratio. This unit is then operated under a reflux ratio between 2:3 to 90:3, preferably 4:3 to 70:3. With a batchwise process it is advantageous to use a low reflux ratio to separate off the water and then a higher reflux ratio to distill off the remaining water together with some of the organic solvent.

In a further preferred batchwise embodiment of the process of the present invention, the remaining water is eliminated by an intermittent distillation process. This involves operating the distillation for some time without removal of distillate, i.e. with 100% reflux, and the water will build up in the column. Then the distillation is run for a brief period without reflux, i.e. with 100% removal, until the water-rich phase has been removed from the column. This change can be repeated a number of times until the desired low water content is obtained in the bottom product.

A further particular advantage of using a distillation column is that, given a column of appropriate design, it can be used to carry out the process of the present invention continuously. In this case, the diamine solution is fed continuously into the column at a plate at which the composition of the boiling liquid phase corresponds to the composition of the diamine solution feed.

With the batchwise process the distillation time until a diamine solution having a water content of below 50 ppm is obtained varies within the range from 1 to 10 hours, depending on the distillation conditions selected in line with the above directions. With a continuous process, this matter does not of course arise. As mentioned earlier, the process of the present invention can be applied to all customary processes for preparing aramids and for solvents generally used for this purpose, for example dimethylacetamide and N-methylpyrrolidone. An organic solvent which is particularly suitable for carrying out the process of the present invention is N-methylpyrrolidone.

The process of the present invention leads to aramids which have the same high hydrolysis resistance as aramids as can be obtained by conventional processes using anhydrous starting materials. If, however, the diamine solution is not distilled as required by the invention, the aramids obtained have a distinctly reduced hydrolysis resistance. A further increase in the aramid quality, in particular the hydrolysis resistance of the products preparable by the process of the present invention, can be obtained by adding to the diamine solution, after the distillation, a small amount of trimethylchlorosilane. The amount of this agent is advantageously chosen in such a way that it is equivalent to the residual amount of water present in the diamine solution. In this way it is possible to remove the remaining water from the distilled diamine solution virtually quantitatively.

Following the removal of the water from the diamine solution in accordance with the present invention, the diamine solution is reacted with dicarbonyl dichloride in a conventional manner. If, owing to the chosen aramid structure, an improvement in the solubility of the polymer in the organic solvent is desired, the diamine solution is first mixed with a known amount of an inorganic salt required for improving the solubility, e.g. lithium chloride or calcium chloride, and then with the dicarbonyl dichloride. The subsequent polycondensation of diamines and dicarbonyl dichlorides takes place in a conventional manner at temperatures of from 20° to 100° C., preferably from 30° to 50° C.

Using the process of the present invention it is possible for example to prepare the aromatic polyamides known from German Patent 2,219,703, U.S. Pat. Nos. 3,819,587 and 3,505,288 and German Offenlegungsschriften 1,595,581 and 3,510,655 in the above-described, particularly advantageous manner.

It is surprising that the process of the present invention makes it possible, starting from moist starting materials, to obtain aramids of excellent quality in respect of strength and color, given the fact, known to persons skilled in the art, that aromatic diamines, in particular those where the amino groups are para to each other, are sensitive compounds which need to be protected from exposure to elevated temperature and oxidizing or otherwise aggressive media and that even the amide type organic solvents tent to eliminate amines in the presence of water. The person skilled in the art therefore had to expect that the distillation removal of water from the solution of the said amines in organic solvents to the point of substantial dewatering would give rise to severe damage to the amines, to loss of substance and to appreciable discoloration. This is evidently also the reason why, despite intensive work in this field, no one has previously opted for the path of the present invention.

EXAMPLE

A. Preparation of Polymer

Aromatic copolyamide of 100 mol % terephthaloyl chloride, 50 mol % of 3,3'-dimethylbenzidine, 25 mol % of 1,4-bis(4'-aminophenoxy)-benzene and 25 mole % of p-phenylenediamine.

48.8 g (0.2 mol) of moist 3,3'-dimethylbenzidine having a water content of 15% by weight, 35.0 g (0.1 mol) of moist 1,4-bis(4'-aminophenoxy)benzene having a water content of 15% by weight and 12.4 g (0.1 mol) of moist p-phenylenediamine having a water content of 15% by weight are dissolved in a 3 l flask equipped with a stirrer, a distillation column and inlet means for pure nitrogen in 2,000 g of recovered N-methylpyrrolidone having a water content of 480 ppm at room temperature by stirring while nitrogen is being passed in.

The apparatus is then evacuated down to a pressure of $25 \times 10^2$ Pa and heated with stirring in a heating bath to an internal flask temperature of 86°–89° C. (external temperature 120° C.). Under these conditions the first 90 minutes of distillation are carried out under a reflux ratio of 5:3, the next three hours under a reflux ratio of 60:3 and the final 30 minutes again under a reflux ratio of 5:3.

The apparatus is then cooled down to 10° C. and vented with nitrogen. Then 82.4 g (0.406 mol) of terephthaloyl chloride are added at a temperature between 12° C. and 67° C. in the course of 65 minutes. The viscous solution is subsequently stirred at 68° C. for 40 minutes, neutralized with 24.5 g of 96% pure calcium oxide and subsequently stirred at 70° C. for a further 30 minutes.

The solution contained 6.5% of copolyamide and 2.2% of calcium chloride. The dissolved copolyamide had an inherent viscosity of 3.41.

The inherent viscosity is defined by the expression $$\eta_{inh} = \frac{\ln \eta_{rel}}{c}$$

where $\eta_{rel}$ is the relative viscosity and c the concentration in g/100 ml.

For the purposes of the present invention it was determined on solutions in each case of 0.5 g polymer in 100 ml of 98% strength by weight of sulfuric acid at 25° C.

B. Test Spinning of Prepared Polymer

The solution was filtered, devolatilized and wet-spun. To this end it was forced through a spinneret with 50 holes each 0.1 mm in diameter at a rate of 8.2 m/min into a horizontally disposed coagulation bath comprising a 60° C. solution of 35% of N-methylpyrrolidone in water. The filaments obtained were drawn off at a speed of 79.5 m/min through two water baths, a washer, a dry godet and finally over a hot plate at 376° C.

The individual filaments have a linear density of 1.58 dtex, a tenacity of 158 cN/tex, a breaking extension of 2.9% and an initial modulus of 61 N/tex, based on 100% extension. This value of the initial modulus is obtained from the stress-strain diagram and standardized to an extension of 100%.

After 100 hours at 150° C. in a steam atmosphere the tenacity of the filaments is 85% of the original value.

COMPARATIVE EXAMPLE

Aromatic copolyamide of 100 mol % of terephthaloyl chloride, 50, mol % of 3,3+-dimethylbenzidine, 25 mol % of 1,4-bis(4'-aminophenoxy)-benzene and 25 mol % of phenylenediamine 42.4 g (0.2 mol) of dry 3,3'-dimethylbenzidine, 29.2 g of (0.1 mol) dry 1,4-bis(4'-aminophenoxy)benzene, 10.8 g (0.1 mol) of dry p-phenylenediamine, 4.2 g of calcium chloride and 4.2 g of lithium chloride are dissolved under nitrogen in 1,754 g of recovered N-methylpyrrolidone having a water content of about 417 ppm, and 82.4 g (0.406 mol) of terephthaloyl chloride are added at between 11° C. and 65° C. in the course of 65 minutes. The viscous solution was subsequently stirred at 68° C. for 40 minutes, neutralized with 24.5 g of 96% pure calcium oxide and subsequently stirred at 70° C. for a further 30 minutes.

The solution contains 6.5% of copolyamide and 2.2% of calcium chloride. The dissolved copolyamide has an inherent viscosity of 3.40.

The polymer obtained was test spun as described in the preceding example.

The individual filaments have a linear density of 1.56 dtex, a tenacity of 120 cN/tex, a breaking extension of 2.5% and an initial modulus of 55 N/tex, based on 100% extension.

Following 100 hours at 150° C. in a steam atmosphere, the tenacity of the filaments is 69% of that of the original value.

What is claimed is:

1. A process for preparing an aromatic polyamide of high hydrolysis resistance by reacting an aromatic dicarbonyl dichloride or dicarbonyl dichloride mixture with an aromatic diamine or diamine mixture in an organic solvent in the presence or absence of an inorganic salt which increases the solubility of the aromatic polyamide formed in the organic solvent, which comprises dissolving the diamine or diamine mixture, having a water content of up to 25% by weight, in the organic solvent, which solvent optionally contains water, and subjecting the solution to a vacuum distillation in an inert gas atmosphere at a pressure of from 100 pascals (Pa) to $5 \times 10^3$ Pa at a bottom of column temperature of about 20° C. to 160° C., until the water content of a bottom product is <100 ppm and then optionally adding inorganic salts, and thereafter the dicarbonyl dichloride or dicarbonyl dichloride mixture to bottom product and reacting to prepare polyamide.

2. The process of claim 1, wherein the diamine or diamine mixture has a water content of from 10 to 25% by weight.

3. The process of claim 1, wherein the solvent is recovered organic solvent which has not been specially rectified.

4. The process of claim 1, wherein the distillation is at a pressure of from $2 \times 10^3$ to $4 \times 10^3$ Pa.

5. The process of claim 1, wherein the distillation is at a temperature of from 50° to 120° C.

6. The process of claim 1, wherein the distillation is under a reflux ratio of from 2:3 to 90:3.

7. The process of claim 6, wherein the distillation is under a reflux ratio of from 4:3 to 70:3.

8. The process of claim 1, wherein the organic solvent is dimethylacetamide, N-methylpyrrolidone or hexamethylphosphoramide.

9. The process of claim 1, wherein the distillation is continuous.

10. The process of claim 1, wherein, following the distillation, the diamine solution is admixed with an amount of trimethylchlorosilane equivalent to residual water level.

11. A process as claimed in claim 1, wherein said bottom product is removed from the distillation apparatus and treated in a separate vessel with said dicarbonyl dichloride mixture.

* * * * *